(12) United States Patent
Neace, Jr. et al.

(10) Patent No.: US 8,720,321 B2
(45) Date of Patent: May 13, 2014

(54) APPARATUS FOR EXTRACTING COLD-BREWED COFFEE CONCENTRATE

(75) Inventors: Robert Neace, Jr., Vancouver, WA (US); Todd H. Maas, Lake Oswego, OR (US)

(73) Assignee: Bean Logik LLC, Vancouver, WA (US)

( * ) Notice: Subject to any disclaimer, the term of this patent is extended or adjusted under 35 U.S.C. 154(b) by 972 days.

(21) Appl. No.: 12/030,150

(22) Filed: Feb. 13, 2008

(65) Prior Publication Data

US 2008/0148955 A1 Jun. 26, 2008
US 2012/0234182 A9 Sep. 20, 2012

Related U.S. Application Data

(63) Continuation-in-part of application No. 11/406,742, filed on Apr. 18, 2006, now Pat. No. 7,858,133.

(60) Provisional application No. 60/672,591, filed on Apr. 18, 2005.

(51) Int. Cl.
*A47J 31/00* (2006.01)

(52) U.S. Cl.
USPC .................................. 99/296; 99/317; 99/323

(58) Field of Classification Search
USPC ............................................. 99/296, 304, 306
See application file for complete search history.

(56) References Cited

U.S. PATENT DOCUMENTS

| | | | | |
|---|---|---|---|---|
| 25,909 | A | * | 10/1859 | Neilson ........................... 99/296 |
| 346,774 | A | * | 8/1886 | Ribbeok ........................... 99/296 |
| 707,937 | A | * | 8/1902 | Nutrizio ........................... 99/306 |
| 1,051,701 | A | * | 1/1913 | Delgado ........................... 99/296 |
| 2,263,610 | A | | 11/1941 | Cain |
| 2,732,787 | A | | 1/1956 | Osborne |
| 2,851,185 | A | | 9/1958 | Taylor |
| 2,878,746 | A | | 3/1959 | Schwinger |
| 2,897,970 | A | | 8/1959 | Schlumbohm |
| 3,215,060 | A | | 11/1965 | Perlov |
| D203,854 | S | | 2/1966 | Douglas |
| D205,678 | S | | 9/1966 | Williams |
| 3,334,574 | A | | 8/1967 | Douglas |
| 3,336,857 | A | * | 8/1967 | Knodt et al. ..................... 99/296 |
| 3,707,842 | A | | 1/1973 | Spivak |

(Continued)

OTHER PUBLICATIONS

The Wall Street Journal, An Iced Coffee Maker; Martelli Pasta; and Fruit-Based Vinegars, www.djreprints.com, Jul. 26, 2013, 2 pages, Dow Jones & Company, Inc., United States of America.

(Continued)

*Primary Examiner* — Reginald L Alexander
(74) *Attorney, Agent, or Firm* — Law Office of Karen Dana Oster, LLC

(57) ABSTRACT

The invention provides an hourglass shaped apparatus for cold brewing coffee, comprising a brew chamber, and extract chamber and a middle unit connecting the brew and extract chambers. The extract and brew chambers comprise two ends of the hourglass shaped middle unit. The brew chamber houses a free-standing self-contained filter containing coffee grounds inside a water-permeable barrier. Water is poured into the brew chamber to generate coffee extract through cold water infusion. After the brewing process, the apparatus is inverted, and the coffee travels into the extract chamber through the middle unit for dispensing. Coffee brewed in this manner is less acidic and more flavorful than the conventionally hot-brewed beverage. All the components of the apparatus, the filter, the brew chamber, the extract chamber, and the middle unit, are detachable.

15 Claims, 20 Drawing Sheets

(56) References Cited

U.S. PATENT DOCUMENTS

| | | | |
|---|---|---|---|
| 4,051,264 A | 9/1977 | Sanderson et al. | |
| 4,112,830 A | 9/1978 | Saito | |
| D250,804 S | 1/1979 | Nilsson | |
| 4,143,590 A | 3/1979 | Kasakoff | |
| 4,226,829 A | 10/1980 | Mike | |
| 4,278,691 A | 7/1981 | Donarumma et al. | |
| D261,389 S | 10/1981 | Pilla | |
| 4,374,026 A * | 2/1983 | Greutert | 210/493.5 |
| D271,215 S | 11/1983 | Hinkle | |
| 4,443,481 A | 4/1984 | Donarumma et al. | |
| 4,622,230 A | 11/1986 | Stone | |
| D321,669 S | 11/1991 | Hoehne | |
| 5,104,666 A * | 4/1992 | Sanvitale | 426/77 |
| 5,125,327 A * | 6/1992 | Winnington-Ingram | 99/306 |
| 5,605,710 A | 2/1997 | Pridonoff | |
| 5,664,480 A | 9/1997 | DiFilippo | |
| 5,836,179 A | 11/1998 | van Laar | |
| D442,009 S | 5/2001 | Schwarzli | |
| 6,761,918 B2 | 7/2004 | Pulikkottil et al. | |
| 6,805,040 B1 | 10/2004 | Chang | |
| D521,329 S | 5/2006 | Bodum | |
| D557,977 S | 12/2007 | Neace, Jr. | |
| 7,958,816 B2 * | 6/2011 | Lin | 99/323 |

OTHER PUBLICATIONS

Toddy, LLC, various web page printouts related to the Toddy Cold Brew System, © 2003-2013 Toddy, LLC, 6 pages, www.toddycafe.com, United States of America.

* cited by examiner

US 8,720,321 B2

APPARATUS FOR EXTRACTING COLD-BREWED COFFEE CONCENTRATE

CLAIM OF PRIORITY

Pursuant to 35 U.S.C. §120, this application is a continuation-in-part of U.S. application Ser. No. 11/406,742 filed on Apr. 18, 2006, published on Oct. 19, 2006 as United States Publication No. 2006/0230944 A1, and issued as U.S. Pat. No. 7,858,133 on Dec. 28, 2010. U.S. application Ser. No. 11/406,742 claimed the benefit of U.S. Provisional Application No. 60/672,591, filed on Apr. 18, 2005.

BACKGROUND OF THE INVENTION

1. Field of the Invention

The present invention generally relates to an improved apparatus for brewing coffee and more particularly to an improved apparatus that cold brews coffee to produce an infusion of coffee extract, and also stores and dispenses coffee.

2. Description of Related Art

Apparatuses for brewing coffee are well known in the art. In the known art, coffee is customarily drip-brewed using heated water. Water is heated in a vessel, and then poured over a container of ground coffee. As the water mingles with the grounds, a coffee extract is produced which drips through a filter into a coffee pot or cup. Improvements to the art have led to machines that automatically heat water and brew coffee in one self-contained device.

Although coffee is traditionally brewed in hot or boiling water, it is also possible to cold brew coffee. A preference for cold brewed coffee has developed, principally due to its flavor. Since many of the bitter oils and acids contained in coffee are soluble only at high temperature, coffee brewed with hot or boiling water can be characterized by a harsh acid taste. Cold brewed coffee avoids this problem. As the preference for cold brewed coffee has grown, several developments in the cold brew process have been made.

U.S. Pat. No. 4,051,264 to Sanderson discloses a process for obtaining a cold water extract from tea leaves. The process involves treating fresh green tea leaves with an enzyme additive to produce dry tea leaves which are cold water extractable. In addition, U.S. Pat. No. 6,761,918 to Pulikkottil discloses a method of processing green tea leaves to produce black tea particles that can be brewed in cold water.

U.S. Pat. No. 2,878,746 discloses a cold water coffee brewer comprising a large canister into which coffee grounds are placed and through which cold water is circulated. The '746 device is designed to infuse cold water with coffee similar to the present invention. However, it is structurally distinct, and achieves the infusion through a drip mechanism by forcing the aqueous solution up through a pipe and onto a series of foraminous shelves rather than separating the aqueous solution from the coffee grounds by inverting the entire apparatus. U.S. Pat. No. 4,112,830 discloses a similar device using cold water to obtain an extraction. This device is also structurally distinct from the present invention, complex and difficult to clean.

The aforementioned cold brewing methods and devices are either meant for brewing substances other than coffee, or they are structurally different from the present invention, and are designed for a different type of process. Therefore, it is an object of the present invention to provide an improved apparatus for cold brewing coffee to produce a liquid extract or infusion that can brew, store and dispense coffee.

A further object of the present invention is to provide an improved cold brew coffee apparatus that is fully invertible wherein the apparatus is of hourglass shape/design to facilitate brewing and dispensing.

A further object of the present invention is to provide an improved cold brew coffee apparatus wherein a unique coffee filter system is free standing and integrates into the brew chamber easily and with no mess.

Finally, it is an objective of the present invention is to provide an improved cold brew coffee apparatus which is a fully enclosed system, whereby coffee grounds are brewed in cold water for extended period of time for better taste and flavor and the resulting extract can be stored in a refrigerator for up to two weeks. These and other objects of the present invention will become better understood with reference to the appended Summary, Description, and Claims.

SUMMARY OF THE INVENTION

The present invention relates to an improved apparatus for brewing coffee to produce a liquid extract/concentrate that can be brewed in cold water and which can be stored fresh in the refrigerator for up to two weeks. The apparatus solves the inherent problems of hot brew methods that produce a bitter, acidic coffee, and improves the art of cold brewing.

The cold brew coffee apparatus comprises a filter or a filter assembly (used interchangeably herein as "filter" unless otherwise specified), a middle unit, a brew chamber and an extract chamber.

When a filter assembly is used, the filter assembly comprises an outer cup, a hollow inner housing and a water-permeable barrier secured between the outer cup and inner housing. The water-permeable barrier is exposed between the side walls of the outer cup and inner housing.

When a middle unit is present, it is hollow and comprises two conical extremities connected by a narrow midsection.

The extract chamber is the same size as the brew chamber, and is mounted to the end of the middle unit, when present, opposite the brew chamber.

To brew coffee, the filter is securely placed on a flat surface on its base and filled with coffee grounds. The brew chamber is then inverted so that its open end fits over the filter. The brew chamber is securely pressed onto the rim of the filter forming a hermetic seal between the brew chamber and the filter. The brew chamber having the secured filter is again inverted and made to stand on its base so that the filter assembly is upside-down.

The brew chamber having the secured filter with coffee grounds is then filled with water thereby soaking the coffee grounds. Different amounts of water can be added to achieve either a more concentrated or less concentrated extract.

If using an embodiment with a middle unit, it is attached by engaging threading at the junction of the brew chamber and the middle unit. The extract chamber is then mounted to an opposite end of the middle unit. A gasket or an o-ring on the threading prevents leakage between the brew/extract chambers and the middle unit. Other embodiments include attaching a middle unit using a snapping mechanism or other leakproof mechanism of joining the middle unit to the brew/extract chambers.

The apparatus is then left to brew, resting securely on the base of the brew chamber. After the proper level of infusion is reached, usually after twelve to twenty-four hours, the brew cycle is complete. The concentration of the coffee extract is time dependent (e.g. a longer brewing time results in a more concentrated extract).

The apparatus is then inverted, and the cold brewed coffee extract is filtered through the filter and into the extract chamber. Once the coffee has drained from the brew chamber, the brew chamber and filter are disassembled and the coffee grounds are disposed. Any cold brewed coffee extract that is not immediately used can be decanted from the extract chamber into a storage container. The storage container may be refrigerated for up to two weeks. The filter, the middle unit and brew and extract chambers can then be cleaned for re-use.

Cold brewed coffee is more concentrated and less acidic than conventionally brewed coffee. To approximate the characteristics of a typical cup of coffee, the cold brewed coffee extract can be diluted with hot water. According to preference, it may also be consumed at a higher concentration, used to prepare an iced beverage or for cooking.

In one preferred embodiment of the invention, the main structural components are composed of acrylic or polycarbonate. In addition, all of the parts of the apparatus are reusable.

These and other features and advantages of this invention are described in, or are apparent from, the following detailed description of various exemplary embodiments of the apparatus and methods according to this invention.

DETAILED DESCRIPTION OF THE INVENTION

Figure 1:
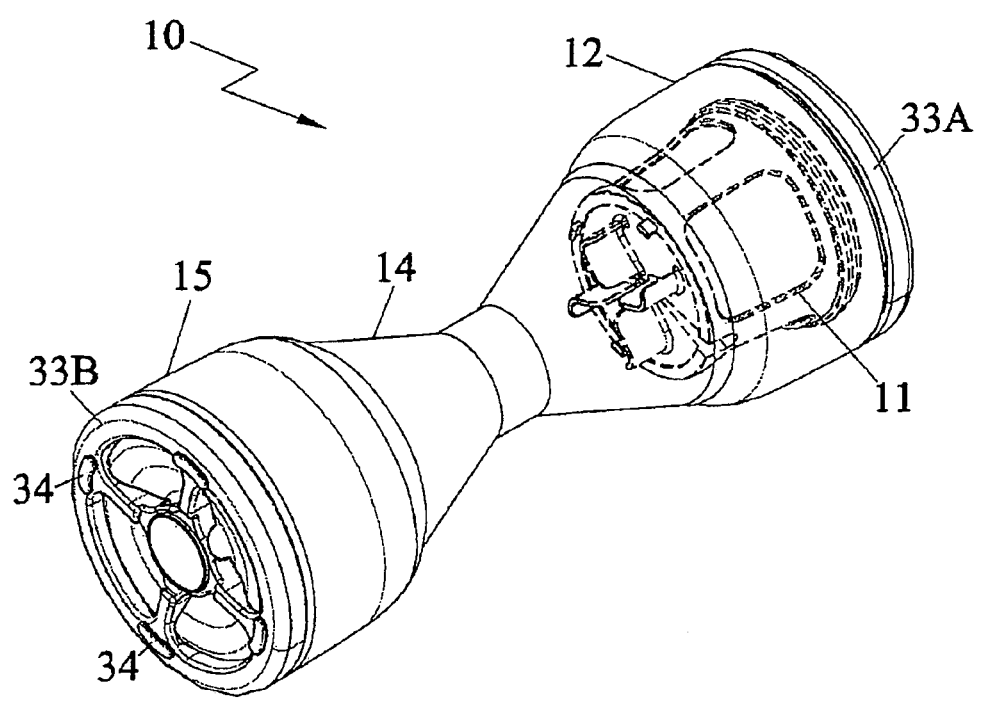
FIG. 1 is a perspective view of a cold brew coffee apparatus in accordance with the present invention.

The novel features of the present invention will become apparent from the following description of the preferred embodiment, and as illustrated in FIGS. 1 through 14. One embodiment of the claimed invention is an hourglass-shaped cold brew coffee apparatus 10, which comprises a filter 11, 41 a brew chamber 12, and a carafe assembly 13. The carafe assembly 13 is comprised of a middle unit 14 and an extract chamber 15. The cold brew coffee apparatus may comprise other shapes and designs for the middle unit 14, brew chamber 12 and extract chamber 15.

Figure 2:
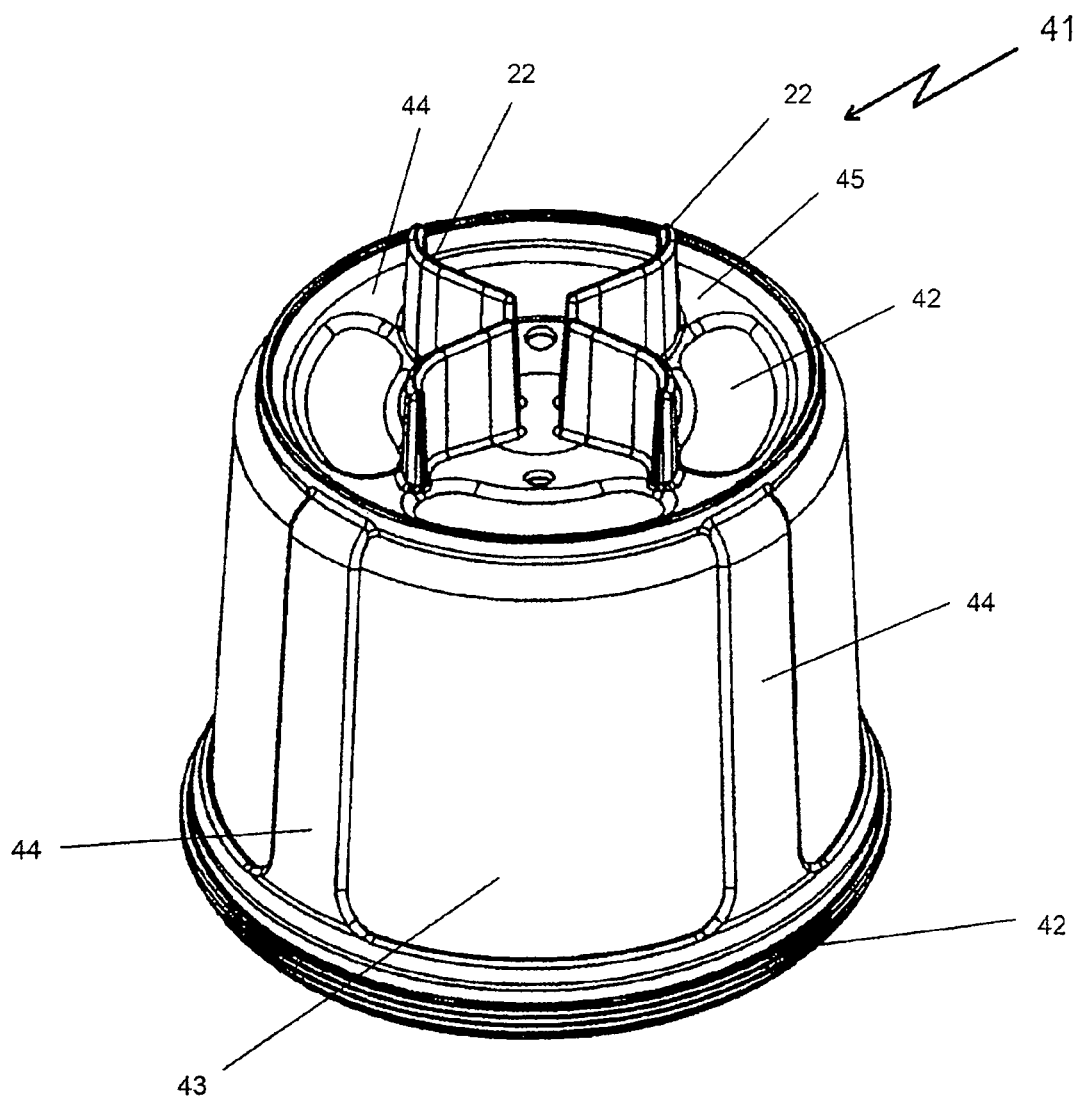
FIG. 2 is perspective view of one embodiment of the filter comprising an extruded frame encasing a water-permeable barrier.
Figure 3:
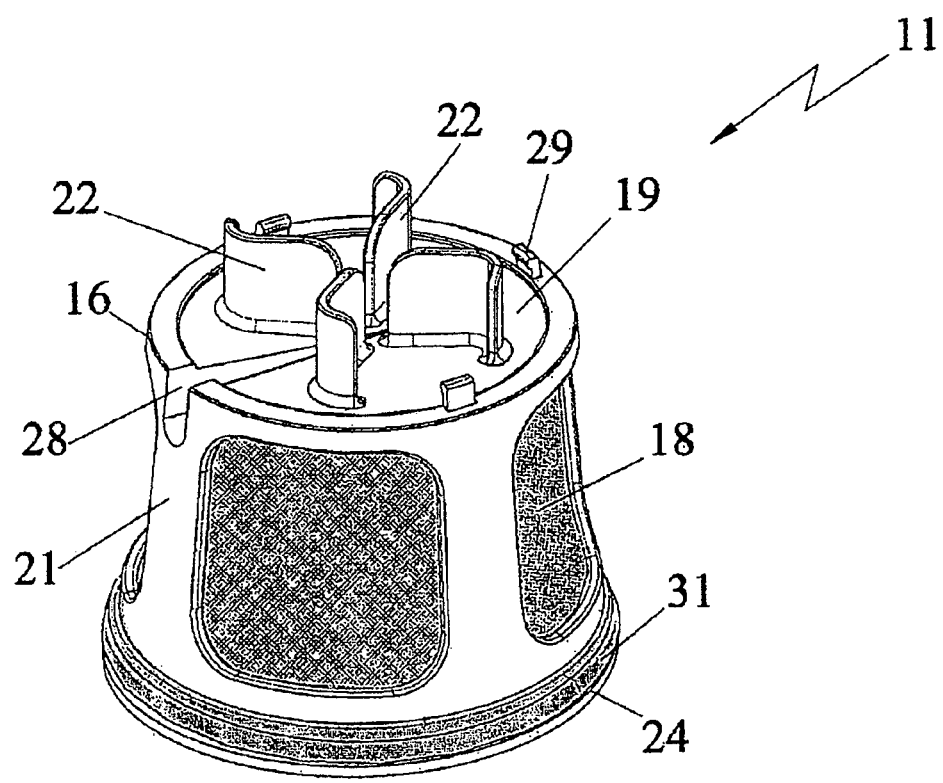
FIG. 3 is a perspective view of the filter of the cold brew coffee apparatus of the present invention.
Figure 4A:
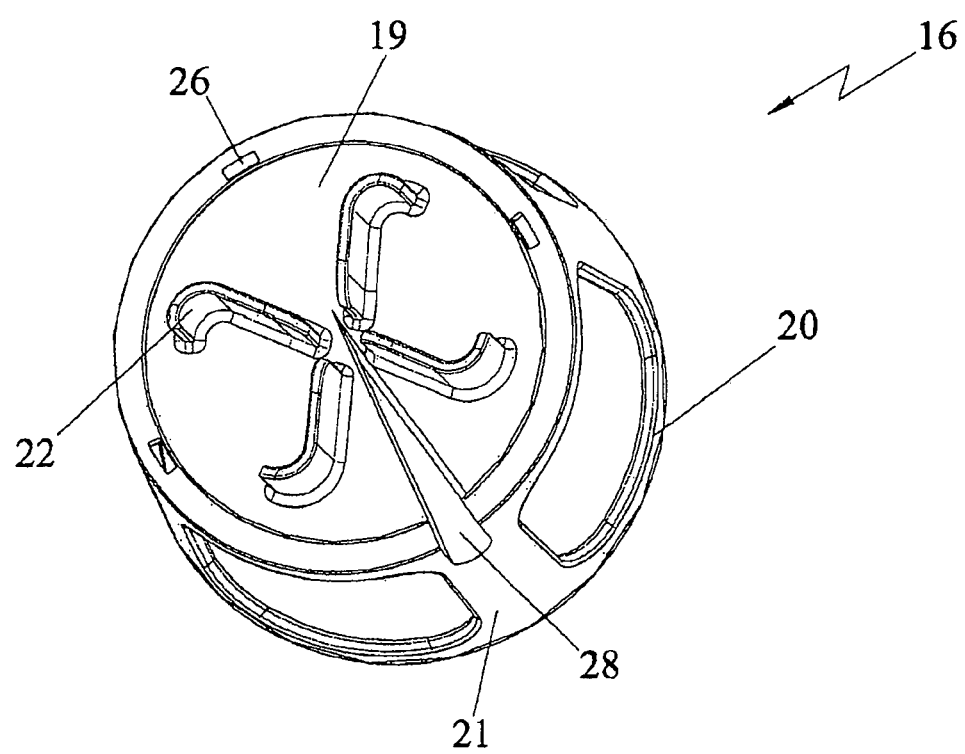
FIGS. 4A, 4B and 4C are different views of the outer cup of an embodiment of the filter comprising a filter assembly.
Figure 4B:
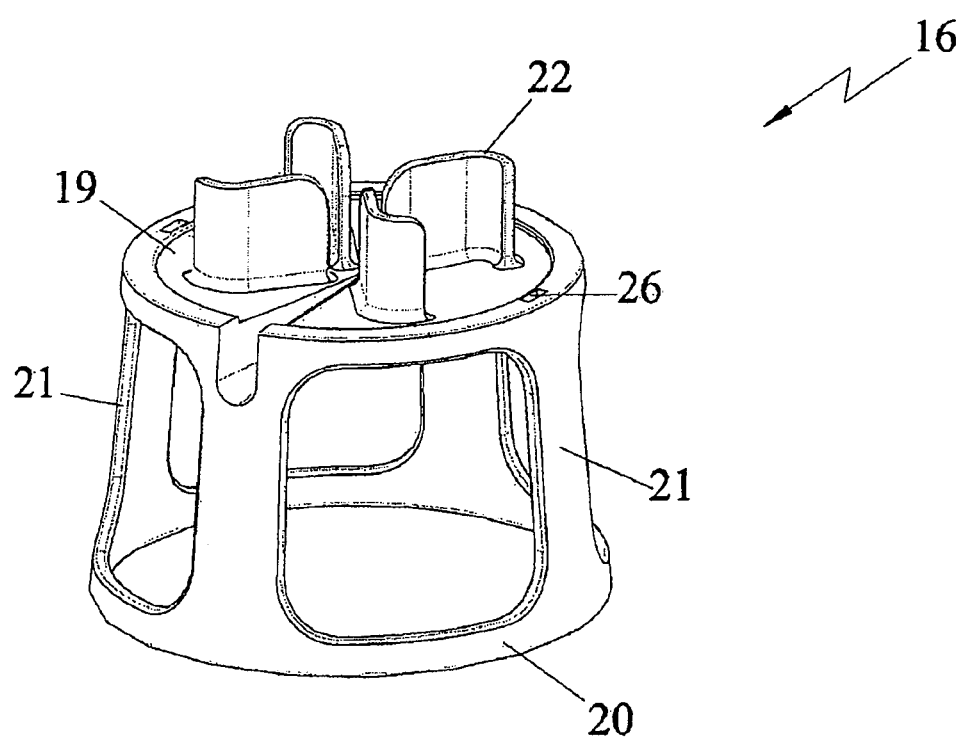
Figure 4C:
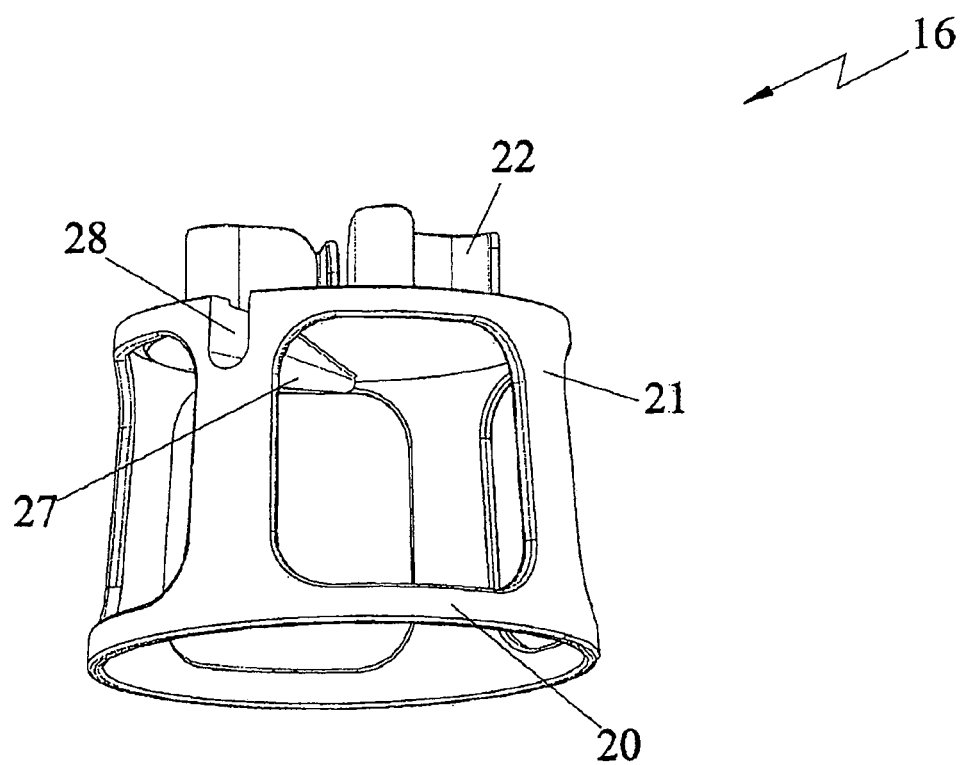
Figure 5A:
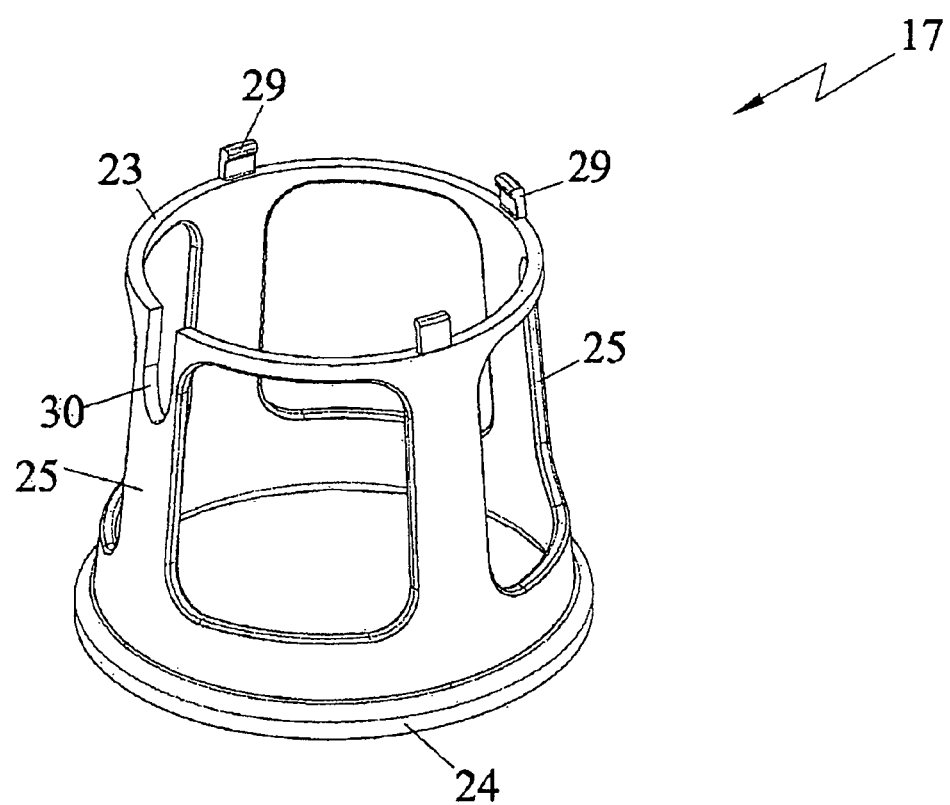
FIGS. 5A and 5B are perspective views of the inner cup of an embodiment of the filter comprising a filter assembly.
Figure 5B:
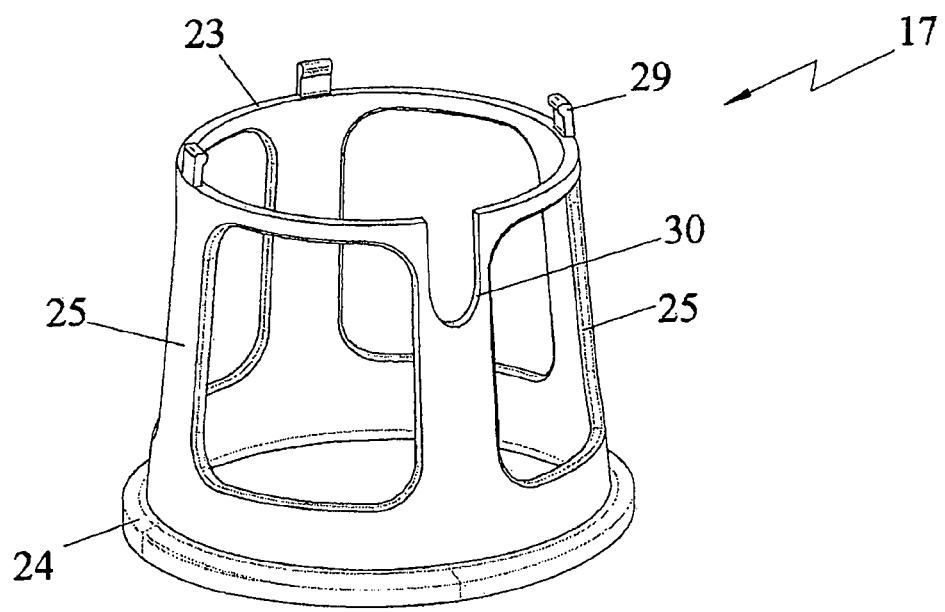
Figure 6:
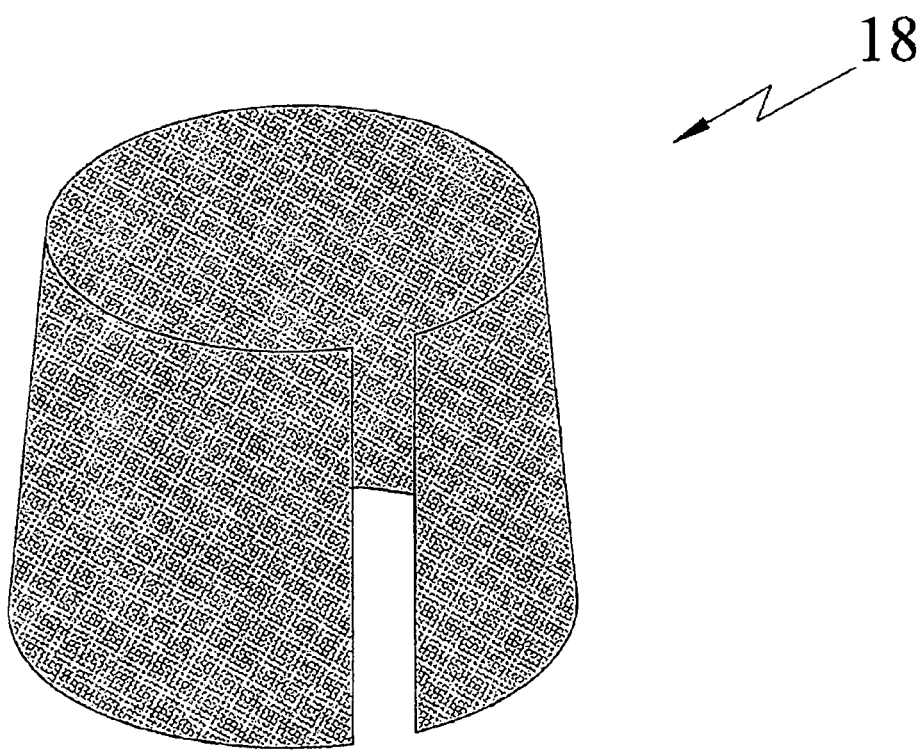
FIG. 6 is a perspective view of an embodiment of the coffee filter comprising a filter assembly.

Referring to FIG. 2, the filter may comprise an extruded frame 44 encasing a water-permeable barrier 43 having a gasket 42 attached to the rim to form a hermetic seal between the inner volume of the filter and the inner volume of the brew chamber. The extruded frame further comprises a substantially flat surface having four leg members 22 to form a base opposite the rim. The leg members 22 act as feet to form a base for the filter as ground coffee is placed into the inner volume of the filter. The extruded frame 44 may be comprised of plastic, aluminum or other non-corrosive material. The water-permeable barrier 43 may be comprised of a variety of materials including plastic, wire mesh or laser cut metal.

The interior of the bottom surface of the brew chamber 12 includes a cylindrical depression 32 that is adapted to receive the gasket 42 of the filter 41. The gasket 42 achieves a hermetic seal between the filter and the brew chamber 12 when the filter is inverted, placed inside the brew chamber and pressure is applied to the flat surface 45 or legs 22 of the filter 41 pushing the filter into the cylindrical depression in the brew chamber 32.

The filter may also comprise an assembly of parts. Referring to FIGS. 3 through 6, the filter assembly 11 includes an outer cup 16, an inner housing 17 and a micro-fine wire mesh or other water-permeable barrier 18 that filters out coffee extract from the coffee grounds. The outer cup's structure comprises a substantially flat surface 19 and a rim 20 opposite and connected to the flat surface 19 by four connecting members 21, which leave four large openings in its side walls. Four leg members 22 on the flat surface 19 of the outer cup 16 serve as feet to support the filter assembly 11 on any flat surface as the filter assembly is filled with coffee grounds. The inner housing's 17 structure comprises a first rim 23 and a second rim 24 connected to the first rim 23 by four connecting members 25, which also leave four large openings in its side walls. The second rim 24 projects outwardly from the exterior of the inner housing 17. The water-permeable barrier 18 is secured between the outer cup 16 and inner housing 17 so that it is exposed from between their connecting members 21 and 25, thereby enabling the coffee extract to pass through.

The side walls of the outer cup 16 are slightly sloped towards the flat surface 19 and the side walls of the inner housing 17 are slightly sloped towards the first rim 23, so that the inner housing is telescopically received in the outer cup. In addition, the external dimensions of the inner housing 17 are substantially equal to the internal dimensions of the outer cup 16, leaving a small clearance between them to firmly accommodate the water-permeable barrier 18. The outer cup 16 includes three holes 26 around the periphery of its flat surface 19 and a projecting section 27, which radially projects downwards from the flat surface 19. The projecting section 27 extends into one of the connecting members and forms a groove 28 on top of the flat surface 19. The groove 28 channels water into the brew chamber to soak the grounds. The interior of the flat surface 19 includes a radially oriented groove (not shown) for receiving the first rim 23 of the inner housing 17. The first rim 23 includes three projecting members 29 and a groove 30 on one of the connecting members. The projecting members 29 are suitably designed to snap into the holes 26 of the outer cup 16.

In order to secure the inner housing 17 inside the outer cup 16, the projecting section 27 is received in the groove 30 of the inner housing and the projecting members 29 are snapped into the holes 26 of the outer cup, by pushing the inner housing inside the outer cup. But, first the water-permeable barrier 18 is wrapped around the inner housing 17 before it is secured inside the outer cup 16. A gasket 31 or an o-ring is placed between the rim 20 of the outer cup and the second rim 24 of the inner housing. The interior of the bottom surface of the brew chamber 12 includes a cylindrical depression 32 that is adapted to receive the second rim 24 of the inner housing 17. The gasket 31 placed between the rim 20 of the outer cup and the second rim 24 of the inner housing helps in achieving a secure fit between the filter 11 and the brew chamber 12.

Figure 7A:
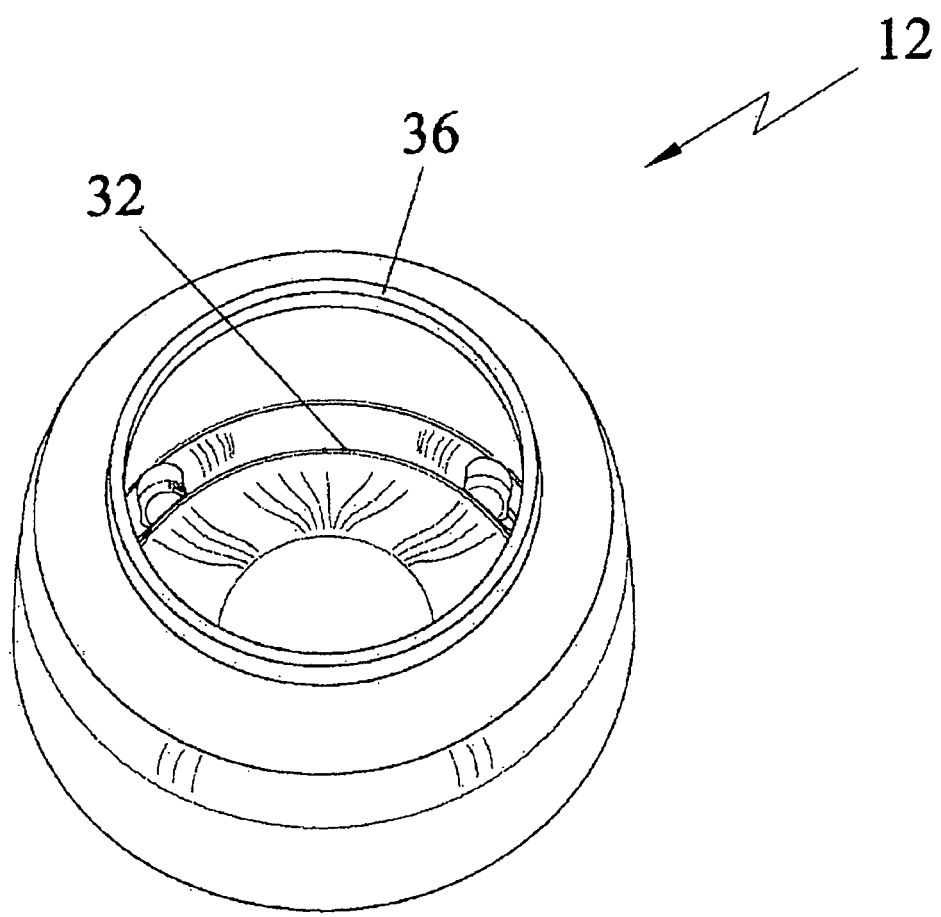
FIGS. 7A and 7B are perspective views of brew/extract chamber.
Figure 7B:
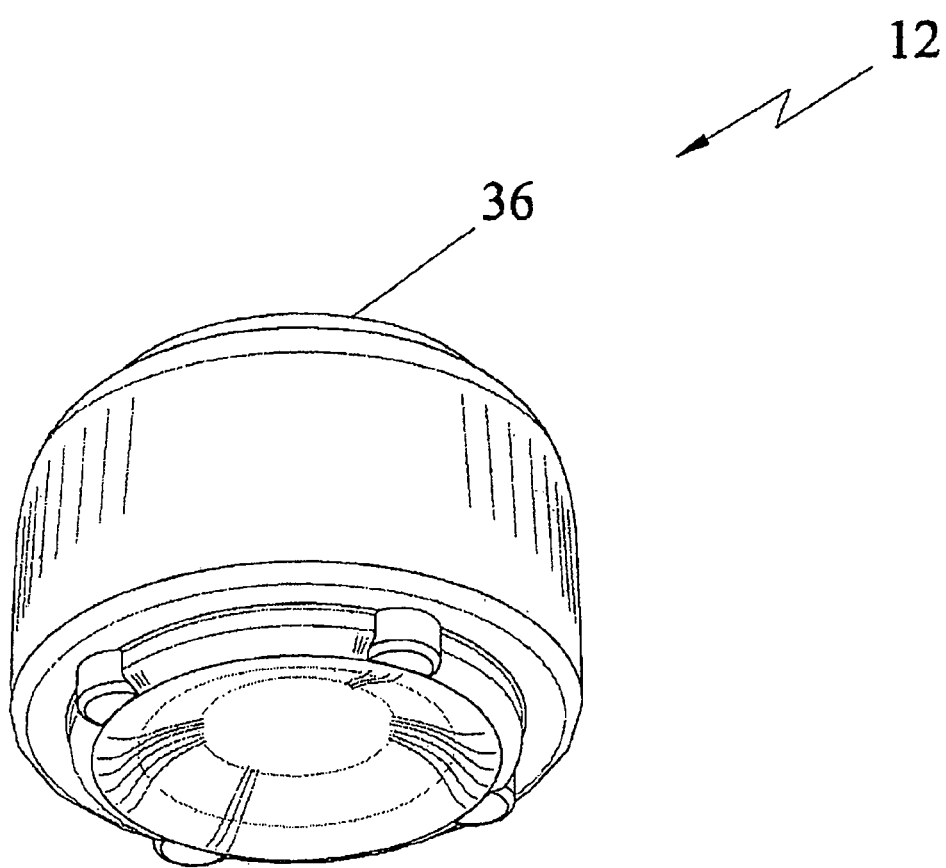
Figure 8:
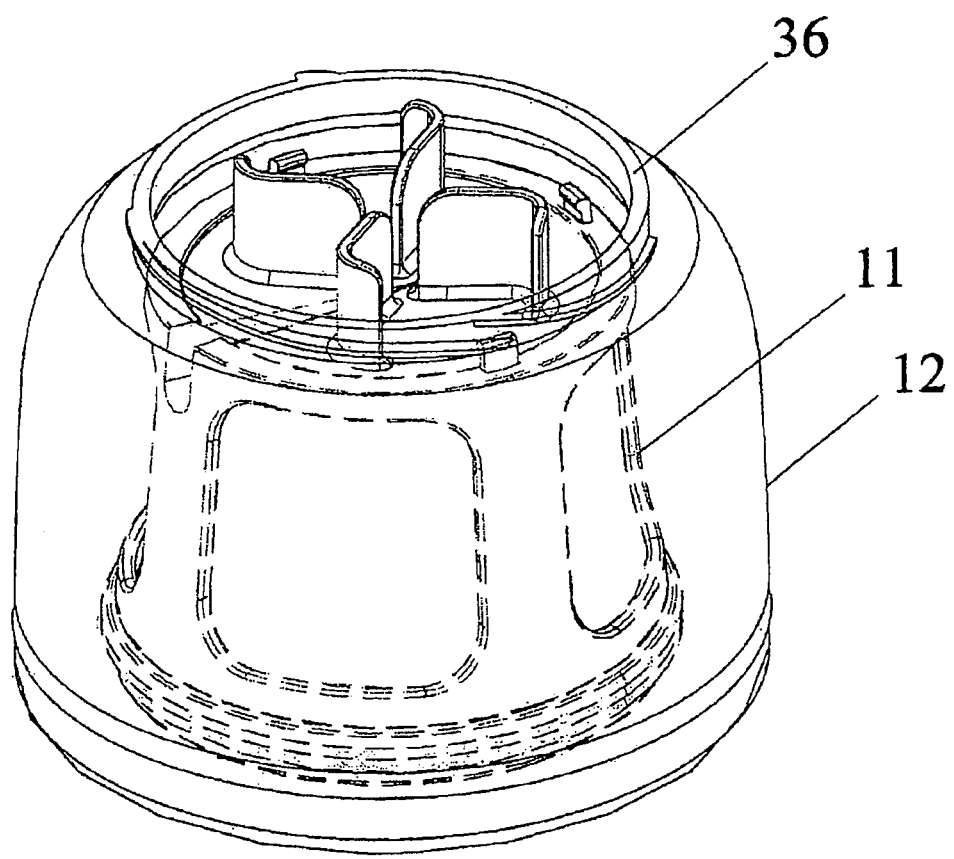
FIG. 8 is a perspective view of the brew chamber with the filter.

Referring to FIGS. 7 and 8, the brew and extract chambers 12 and 15 are identical and constitute approximately one fourth the size of the whole apparatus 10, representing the ends of the middle unit 14. The interior of the bottom surface of the brew and extract chambers 12 and 15 includes a cylindrical depression 32 to receive the gasket 21, 42 of the filter forming a hermetic seal.

Figure 9A:
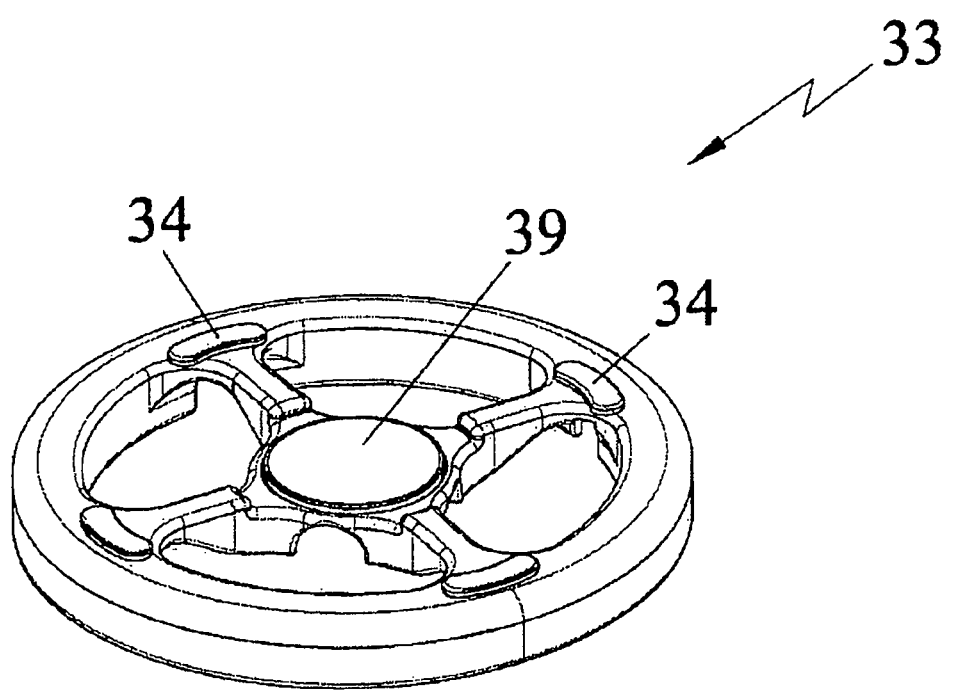
FIGS. 9A and 9B are perspective views of the bases with gripping pads.
Figure 9B:
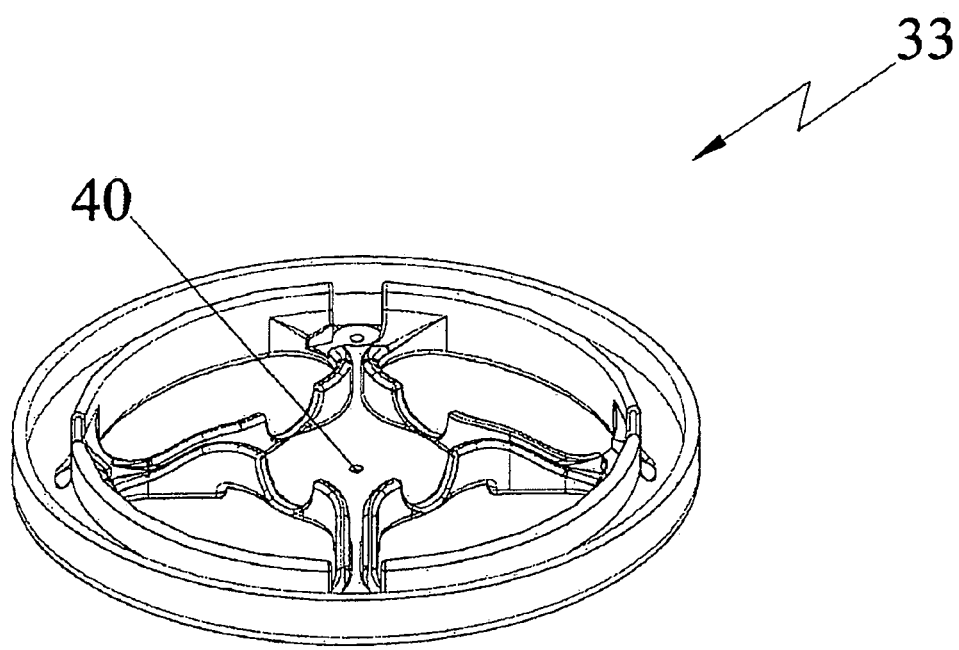

Referring to FIGS. 9A and 9B, a first base 33A is attached to the brew chamber 12. The cylindrical depression 32 in the interior of the brew chamber leads to a cylindrical projection on its exterior bottom surface. The first base 33A is adapted to be firmly attached over the cylindrical projection. A second base 33B, similar to the first base 33A, is attached to the bottom of the extract chamber 15. Several designs and structures are possible for the bases, one of them being shown in FIGS. 9A and 9B. The bases further include a plurality of gripping pads 34 made of rubber or other anti-slip materials. The center portion of the bases may include a removable disc 39, which can be snapped into the indentation in the base 40. Even the gripping pads can be snapped onto the bases. The removable disc 39 may be marked with a trademark, logo or other design.

Figure 10A:
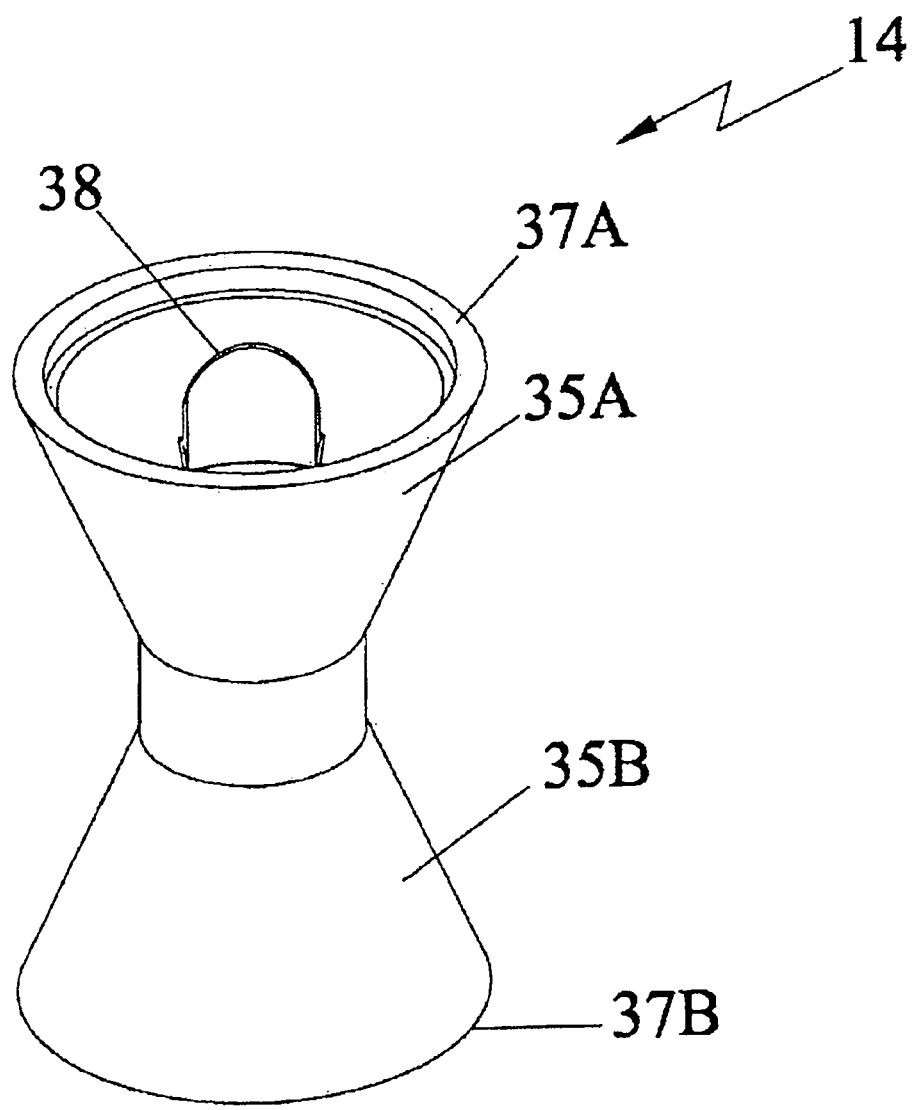
FIGS. 10A and 10B are perspective views of the middle unit.
Figure 10B:
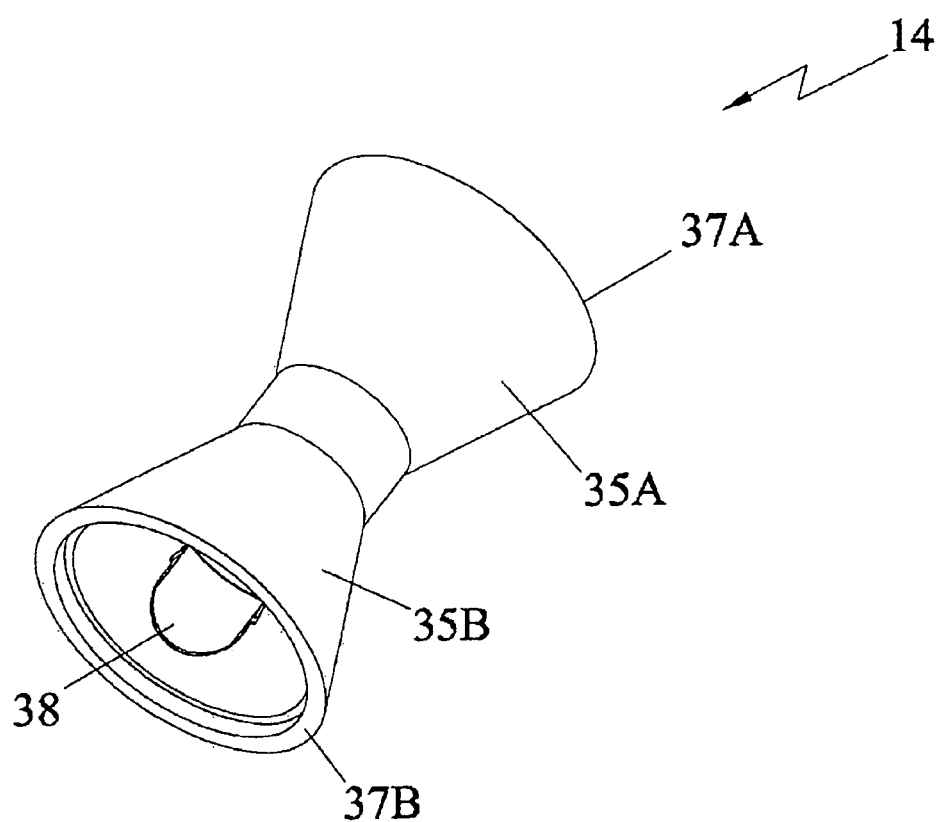
Figure 11:
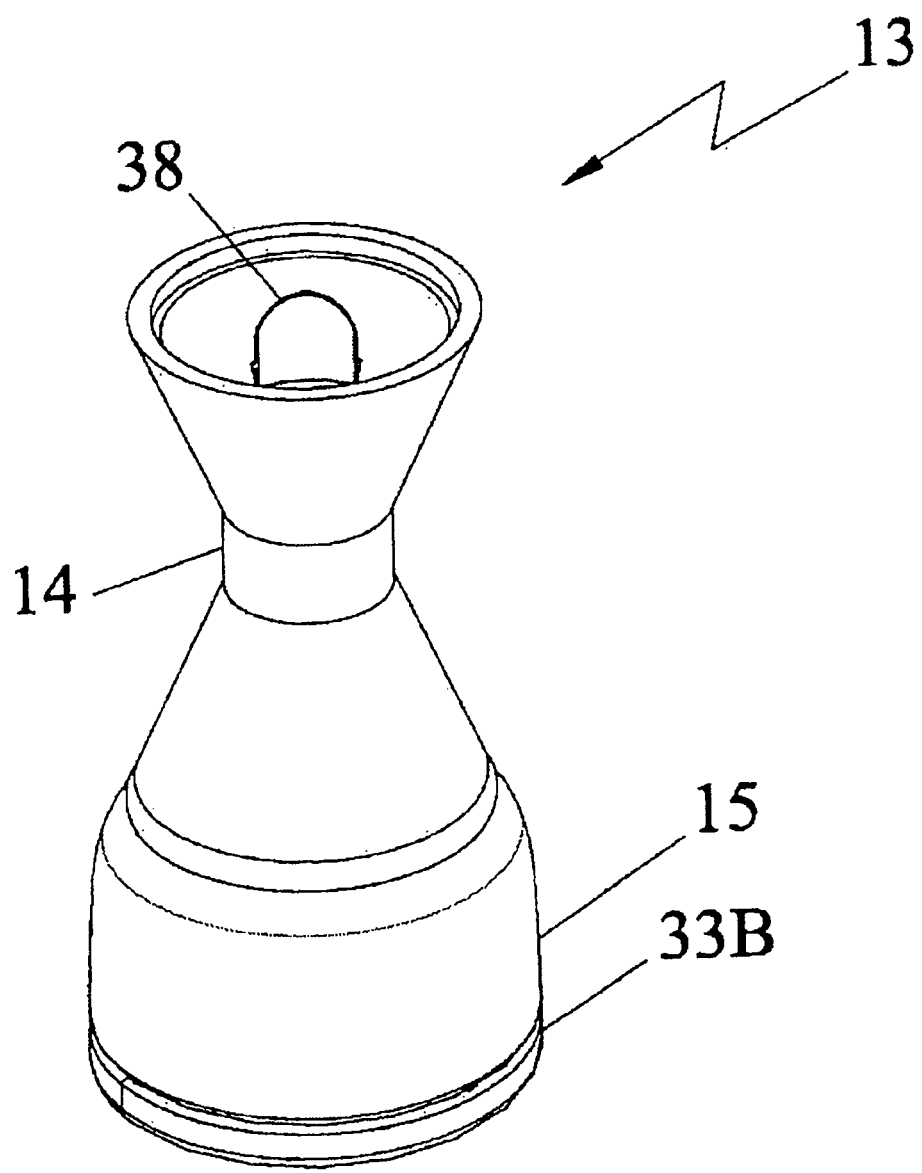
FIG. 11 is a perspective view of the carafe assembly.

Referring to FIGS. 10A and 10B, the middle unit 14 is hollow to allow the passage of liquid. One example of the middle unit comprises two conical members 35A and 35B connected at their vertices. The middle unit 14 is approximately half the size of the apparatus 10. The inner surface of the conical members includes pouring structures 38. The brew and extract chambers include helical threaded indentation on the exterior of their mouths 36, which are adapted to engage a complimentary set of threaded indentation on the inner surfaces of the two ends 37 of the middle unit 14. A gasket is used to form a hermetic seal at the junction of the middle unit 14 and the brew/extract chambers. The middle unit 14, along with the brew and extract chambers 12 and 15 mounted to its either ends, is designed to conform to an hourglass shape. Other shapes that allow the passage of liquid between the brew and extract chambers are also contemplated.

Figure 12:
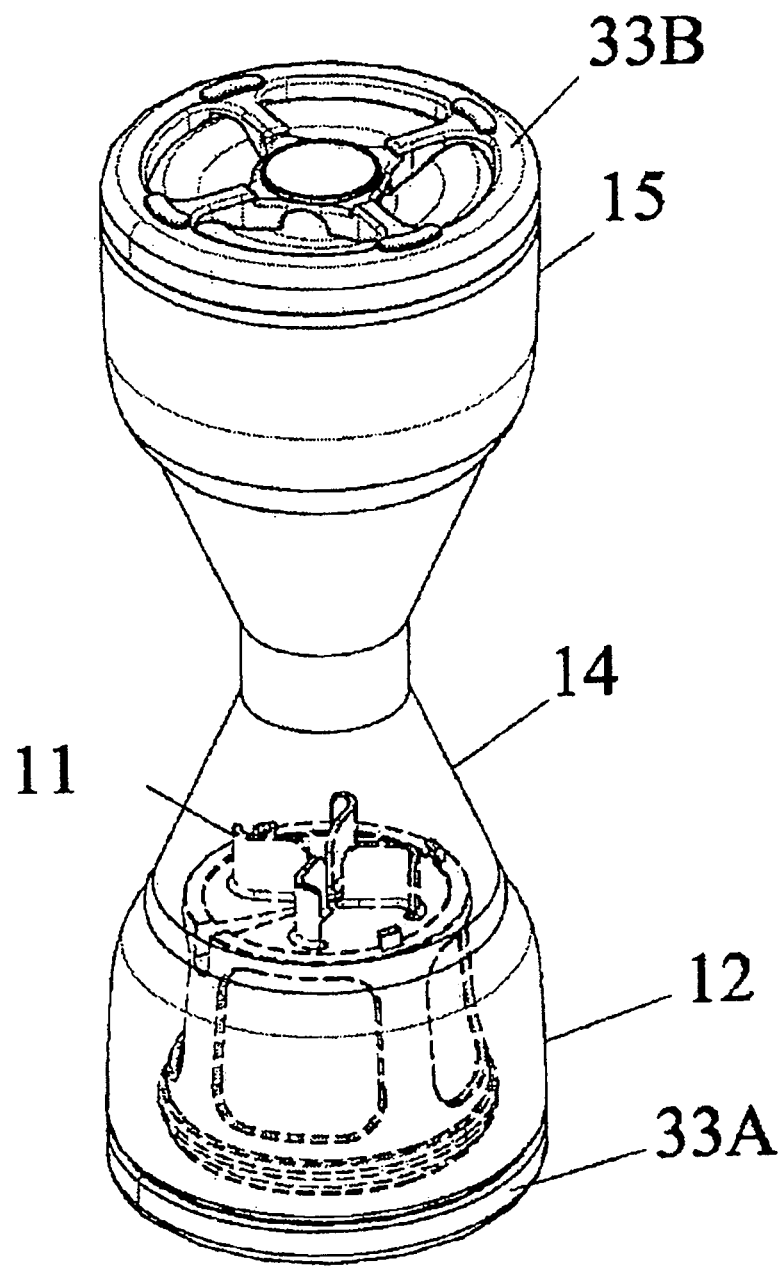
FIG. 12 is a front view of the cold brew coffee apparatus of the present invention, fully assembled and standing on the brew chamber.
Figure 14:
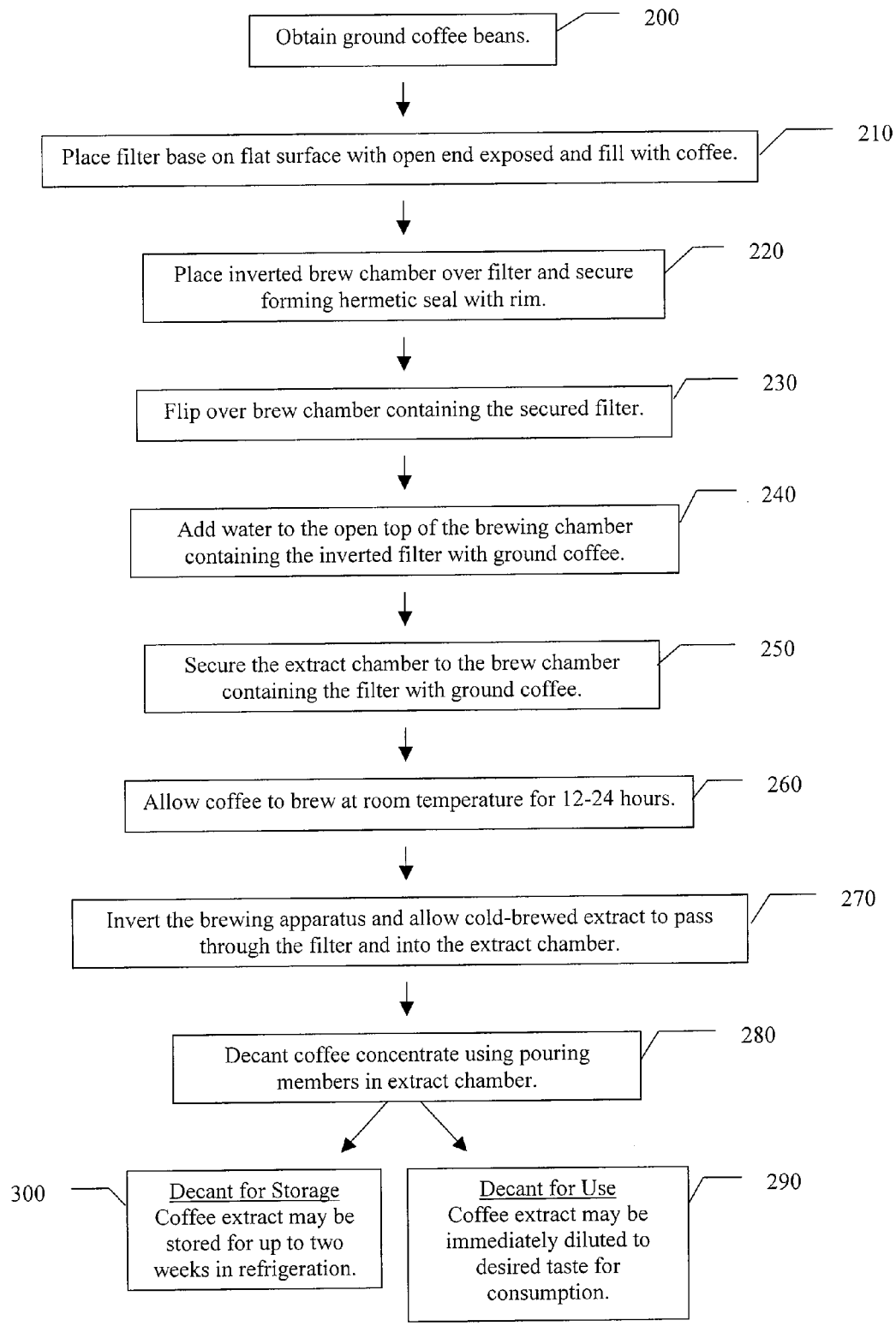
FIG. 14 is a box diagram explaining how to use the apparatus.

Referring to FIG. 14, in order to use the apparatus, first, obtain ground coffee beans either by purchasing pre-ground beans or grinding whole beans 200. Detach the brew chamber 12 from the middle unit 14 and the filter 11, 41 is removed and set aside the extract chamber 15 still mounted to the opposite end of the middle unit 37B. Approximately two cups of fresh coffee grounds are then placed in the filter which is stabilized and supported by the leg members 22 with the open end up exposing the inner volume 210. The brew chamber 12 with its associated base 33A is inverted 220 so that its open end is fitted over the filter 11, 41, in a downward motion sealing in place the gasket 31, 42 using pressure to engage the gasket with the cylindrical depression in the brew chamber. The inner volume of the filter 11, 41 thereby encloses the coffee grounds and forming a hermetic seal between the gasket 31, 42 and the brew chamber 220. The brew chamber 12, now engaged with the filter 11, 41, is then inverted again so the first base 33A is down and the leg members 22 of the filter 11, 41 are facing up 230 exposing the open top of the brew chamber. Add cold water (room temperature or colder) or other brewing liquid to the open top of the brew chamber containing the filter with ground coffee 240. Add sufficient liquid to cover the grounds without overflowing 240. One of the ends 37A of the middle unit is mounted to the brew chamber 250 secured to an inverted filter with coffee. The apparatus 10 now stands on the brew chamber 12, particularly on the first base 33A attached to the brew chamber 12, as seen in FIG. 12. The gaskets between each base and the middle unit prevent leakage after the apparatus is assembled. Water soaks into the grounds and starts the cold brew infusion process. The brewing process takes approximately twelve to twenty-four hours at room temperature although brewing may occur at lower temperatures not to exceed freezing 260.

Figure 13:
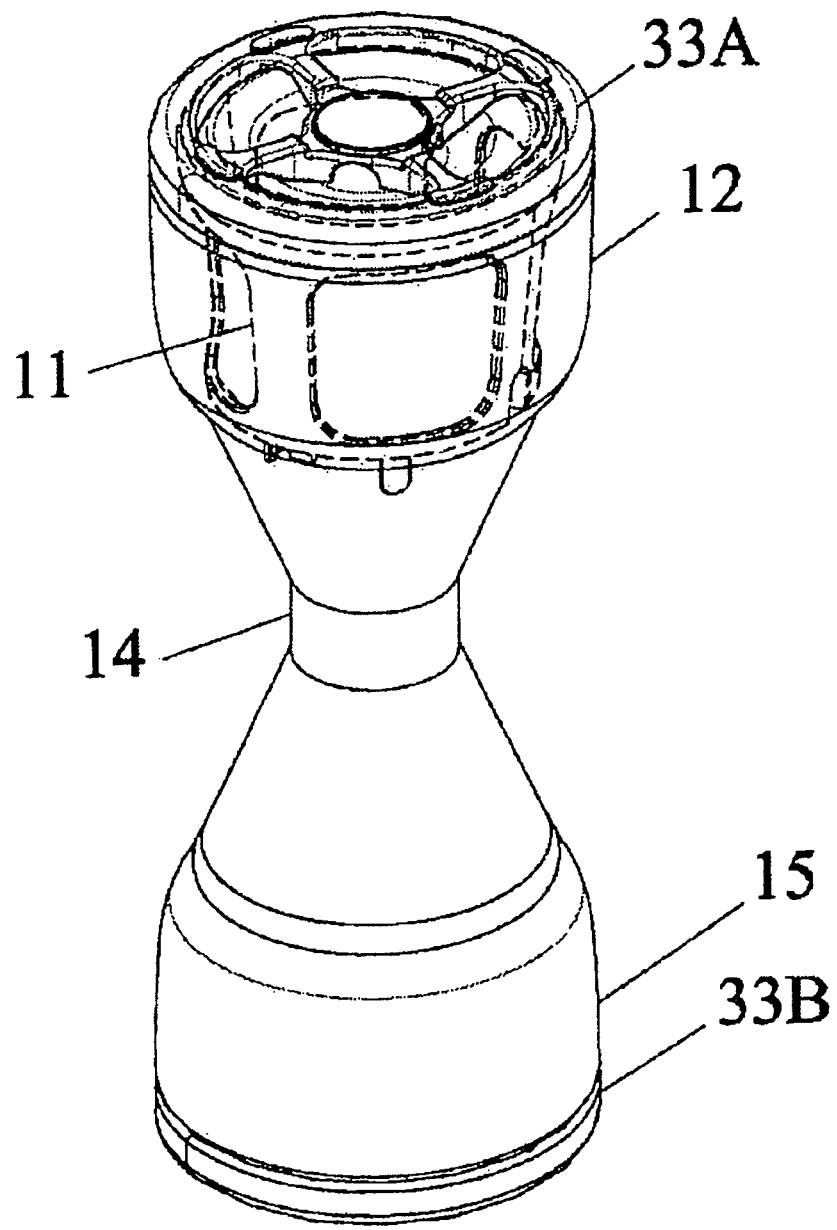
FIG. 13 is a front view of the cold brew coffee apparatus of the present invention, fully assembled and standing on the extract chamber to collect the coffee.

After the brew cycle is complete, invert the brewing apparatus 10 to stand on the extract chamber 15, allowing the soluble coffee extract to pass through the filter and middle unit and accumulate in the extract chamber 270, as seen in FIG. 13. The cold brewed coffee extract then drains out of the filter 41 and the brew chamber 12, and into the extract chamber 15 through the middle unit 14, 270. The apparatus 10 takes approximately five minutes to complete this step. After all the extract has drained into the extract chamber 15, the brew chamber 12 and filter 11, 41 are disconnected and the coffee grounds are disposed of. The coffee extract is then decanted from the extract chamber 15 using the pouring structures 38 located on the inner surface of the middle unit 280. The coffee extract can be poured into a storage container and can be kept fresh under refrigeration for up to two weeks 300. Once the coffee has been dispensed, the entire apparatus can be disassembled and cleaned.

Coffee brewed in the apparatus 10 is a deep rich extract coffee concentrate, and is far less acidic than conventionally brewed coffee. It can be diluted with hot water to a desired taste and strength 290. To make a typical cup of coffee, two tablespoons of extract are added to 8 oz of hot water. More or less concentrate can be added for desired taste and strength. In one preferred embodiment of the invention, the brew chamber, the extract chamber, and the middle unit of the apparatus are made of acrylic or polycarbonate material. Other materials may be used, however, including glass, metal and other forms of plastic.

The features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A cold brew coffee apparatus comprising:
   (a) a first container having a first container interior volume, a first container bottom surface, and a first container opening remote from said first container bottom surface;
   (b) a second container having a second container interior volume, a second container bottom surface, and a second container opening remote from said second container surface;
   (c) a filter comprising a frame supporting a water-permeable barrier, said filter having a filter base and a filter rim, said filter defining a filter interior volume, said filter sized to fit within said first container interior volume through said first container opening; and
   (d) at least one feature selected from the group consisting of:
      (i) a middle unit comprised of first and second opposed openings and a closed channel, wherein said first container opening and said second container opening engage to form a water impermeable seal by said first container opening engaging said second opening of said middle unit and said second container opening engaging said first opening of said middle unit;
      (ii) a gasket associated with said filter rim, said first container bottom surface being adapted to receive said filter rim, said filter rim and said first container bottom surface forming a seal therebetween and securing said filter within the first container; and
      (iii) a gasket associated with said filter rim, said first container bottom surface having a cylindrical depression for mating with said filter rim, said filter rim and said cylindrical depression forming a seal therebetween and securing said filter within the first container;
   wherein said filter is positionable within said first container so that said filter rim attaches to said first container bottom surface to divide said filter interior volume from the remainder of said first container interior volume;
   wherein said first container and said second container are capable of forming said water impermeable seal between said first container opening and said second container opening;
   whereby cold brew infusion occurs when water in said first container interior volume passes through said water-permeable barrier and soaks coffee grounds within said filter interior volume to form a soluble coffee extract.

2. The cold brew coffee apparatus of claim 1, wherein said first container opening and said second container opening directly engage to form said water impermeable seal.

3. The cold brew coffee apparatus of claim claim 1, wherein said middle unit allows liquid to flow between the opposed openings to allow liquid to flow between said first container and said second container.

4. The cold brew coffee apparatus of claim 1, wherein said filter rim securely attaches to said first container bottom surface to form a hermetic seal between said filter interior volume and the remainder of said first container interior volume.

5. The cold brew coffee apparatus of claim 1, wherein said middle unit has an hourglass shape.

6. The cold brew coffee apparatus of claim 1, wherein an inner surface of the middle unit comprises a pouring structure for directing liquid.

7. The cold brew coffee apparatus of claim 1, wherein said first container opening, said second container opening, and said first and second opposed openings of the middle unit include threading for mounting each of the first and second containers to the middle unit.

8. The cold brew coffee apparatus of claim 1, wherein said first container bottom surface includes structure to receive said filter rim.

9. The cold brew coffee apparatus of claim 1, wherein said water-permeable barrier allows ongoing cold brew infusion between said coffee grounds within said filter interior volume and fluids within said first container interior volume.

10. A cold brew coffee apparatus comprising:
    (a) a first container having a first container interior volume, a first container bottom surface, and a first container opening remote from said first container bottom surface;
    (b) a second container having a second container interior volume, a second container bottom surface, and a second container opening from said second container surface; and
    (c) a filter comprising a frame supporting a water-permeable barrier, said filter having a filter base and a filter rim, said filter defining a filter interior volume, said filter sized to fit within said first container interior volume through said first container opening;
    wherein said first container and said second container are capable of forming a water impermeable seal between said first container opening and said second container opening;
    wherein said filter base includes at least one leg member on which said filter is capable of standing;
    whereby cold brew infusion occurs when water in said first container interior volume passes through said water-permeable barrier and soaks coffee grounds within said filter interior volume to form a soluble coffee extract.

11. The cold brew coffee apparatus of claim 10, wherein said filter is capable of resting on said at least one leg member during filling of said filter with coffee grounds.

12. The cold brew coffee apparatus of claim 10, wherein said at least one leg member is a plurality of leg members.

13. A cold brew coffee apparatus comprising:
    (a) a first container having a first container interior volume, a first container bottom surface, and a first container opening remote from said first container bottom surface;
    (b) a second container having a second container interior volume, a second container bottom surface, and a second container opening from said second container surface;
    (c) a filter comprising a frame supporting a water-permeable barrier, said filter having a filter base and a filter rim, said filter defining a filter interior volume, said filter sized to fit within said first container interior volume through said first container opening; and
    (d) a middle unit comprised of first and second opposed openings and a closed channel;
    wherein said first container opening and said second container opening engage to form a water impermeable seal by said first container opening engaging said second opening of said middle unit and said second container opening engaging said first opening of said middle unit, said middle unit being hollow to allow the passage of liquids between said first and second containers;
    whereby cold brew infusion occurs when water in said first container interior volume passes through said water-permeable barrier and soaks coffee grounds within said filter interior volume to form a soluble coffee extract.

14. A cold brew coffee apparatus comprising:
    (a) a fluid-holding container defining a container interior volume, a container bottom surface, and a container opening remote from said container bottom surface;

(b) a filter comprising a frame supporting a water-permeable barrier, said filter having a filter base and a filter rim, said filter defining a filter interior volume, said filter sized to fit within said container interior volume through said container opening; and (c) at least one feature selected from the group consisting of:
  (i) said filter base includes at least one leg member on which said filter is capable of standing;
  (ii) said filter base includes a plurality of leg members on which said filter is capable of standing;
  (iii) said filter rim comprising a gasket, said filter rim and said container bottom surface forming a seal therebetween and securing said filter within the container;
  (iv) said filter rim comprising a gasket and said container bottom surface comprising a cylindrical depression for mating with said filter rim, said filter rim and said cylindrical depression forming a seal therebetween and securing said filter within the container; and
  (v) said filter rim comprising a gasket and said container bottom surface comprising a cylindrical depression for mating with said filter rim, said filter rim and said cylindrical depression forming a seal therebetween and securing said filter within the container, said gasket being located on an outer side of the rim such that the gasket is abutted to an outer wall of said cylindrical depression when the filter is secured within the container;

wherein said filter is positionable within said container so that said filter rim attaches to said container bottom surface to divide said filter interior volume from the remainder of said container interior volume;

wherein when said filter rim is attached to said container bottom surface, said filter interior volume is configured to enclose coffee grounds;

whereby cold brew infusion occurs when water in said container interior volume passes through said water-permeable barrier and soaks coffee grounds within said filter interior volume to form a soluble coffee extract.

15. The cold brew coffee apparatus of claim 14, wherein said water-permeable barrier allows ongoing cold brew infusion between said coffee grounds within said filter interior volume and fluids within said first container interior volume.

* * * * *